US008322493B2

(12) United States Patent
Mizuno et al.

(10) Patent No.: US 8,322,493 B2

(45) Date of Patent: Dec. 4, 2012

(54) POWER UNIT

(75) Inventors: Kinya Mizuno, Wako (JP); Yasushi Fujimoto, Wako (JP); Masako Takahashi, Wako (JP); Hiroshi Sotani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1060 days.

(21) Appl. No.: 11/690,987

(22) Filed: Mar. 26, 2007

(65) Prior Publication Data

US 2007/0227491 A1 Oct. 4, 2007

(30) Foreign Application Priority Data

Mar. 31, 2006 (JP) ................................ 2006-098112

(51) Int. Cl.
*F16H 57/04* (2010.01)

(52) U.S. Cl. ...................................................... 184/6.12

(58) Field of Classification Search ................. 184/6.12, 184/6.13

See application file for complete search history.

(56) References Cited

U.S. PATENT DOCUMENTS

| | | | | |
|---|---|---|---|---|
| 7,121,163 B2 * | 10/2006 | Ito et al. | 74/606 R |
| 2004/0112677 A1 * | 6/2004 | Ito et al. | 184/6.5 |

FOREIGN PATENT DOCUMENTS

JP 2001-73737 A 3/2001

* cited by examiner

*Primary Examiner* — Robert A Siconolfi
*Assistant Examiner* — James Hsiao
(74) *Attorney, Agent, or Firm* — Westerman, Hattori, Daniels & Adrian, LLP

(57) ABSTRACT

A power unit provided with a dry sump type lubricating device includes a power unit case that is covered in part by a power unit case cover and is divided into a front unit case and a rear unit case. The power unit also includes a crankshaft rotatably supported by a crank chamber that is formed by the power unit case and a shift shaft rotatably supported by a transmission chamber that is provided adjacent to the crank chamber. The power unit also includes an oil tank disposed on the crank chamber side of an anteroposterior outside surface of the power unit case cover and a hydraulic control device for controlling a shift clutch, disposed on the transmission chamber side of the anteroposterior outside surface of the power unit case cover.

7 Claims, 9 Drawing Sheets

POWER UNIT

FIELD OF THE INVENTION

The present invention relates to a power unit integrally composed of an internal combustion engine and a transmission, and more particularly to a power unit equipped with a dry sump type lubricating device.

BACKGROUND OF THE INVENTION

A power unit equipped with a dry sump type lubricating device includes an oil tank for storing oil pumped by a scavenging pump. The oil tank is generally defined within a unit case. The power unit having a unit case cover includes the oil tank defined between a unit case and the unit case cover (e.g., see Japanese Patent Laid-Open No. 2001-73736).

In Japanese Patent Laid-Open No. 2001-73736, a unit case is formed with a crank chamber and a transmission chamber. The crank chamber journals a crankshaft to direct the traveling direction of a vehicle. The transmission chamber is disposed on the side of the crank chamber so as to journal a shift shaft. The unit case is divided into two portions, i.e., a front case and a rear case, in a back-and-forth direction. The front case is covered by a front case cover from the front. The oil tank is formed between the front case cover and the front case and between the front case and the rear case.

Thus, the oil tank is formed to protrude laterally outwardly from a shift chamber so as to avoid the shift chamber, a shift clutch and the like as well as the crank chamber. This enlarges the entire power unit.

The present invention has been made in view of the foregoing and it is an object of the invention is to provide a power unit equipped with a dry sump type lubricating oil device that can be reduced in size and in pump loss by disposing an oil tank at an appropriate position outside a unit case cover.

SUMMARY OF THE INVENTION

In order to achieve the above object, a power unit is provided with a dry sump type lubricating device, in which a unit case cover covers at least one of the front and rear of a unit case which forms a crank chamber rotatably supporting a crankshaft to direct an traveling direction of a vehicle and a transmission chamber located on the side of the crank chamber and rotatably supporting a shift shaft. This power unit includes: an oil tank disposed at a portion on an anteroposterior outside of the unit case cover and close to the crank chamber; and a hydraulic control device for controlling a shift clutch, disposed at a portion on the same anteroposterior outside as the oil tank and close to the transmission chamber.

Thus, since the oil tank is disposed by use of the relatively wide area-space located on the anteroposterior outside of the unit case cover and close to the crank chamber. Therefore, the oil tank does not interfere with the hydraulic control device disposed on the same outside as the oil tank and closed to the transmission chamber. In addition, the oil tank can ensure a sufficient capacity while reducing the amount of protrusion from the unit case cover and the power unit can be downsized by avoiding the lateral expansion of the unit case.

In addition, the hydraulic control device controlling the shift clutch is appropriately arranged close to the transmission chamber and the hydraulic control device, the oil tank and other equipment are collectively arranged on the unit case cover. Therefore, the oil passages can be shortened to reduce a pump loss.

According to another aspect of the present invention, the oil tank is provided to extend from a lower end, to an upper end, of the unit case cover; and a shift motor for shifting a shift gear of the shift shaft is disposed in a space, on the unit case cover, surrounded by the oil tank, the hydraulic control device and an output shaft projecting from the transmission chamber.

Therefore, the equipment can efficiently be arranged by effectively using the space, thereby making the entire power unit compact.

BRIEF DESCRIPTION OF THE DRAWINGS

An embodiment of the present invention will be described with reference to the accompanying drawings, wherein.

DETAILED DESCRIPTION OF THE INVENTION

An embodiment of the present invention will be hereinafter described with reference to FIGS. 1 through 9.

Figure 1:
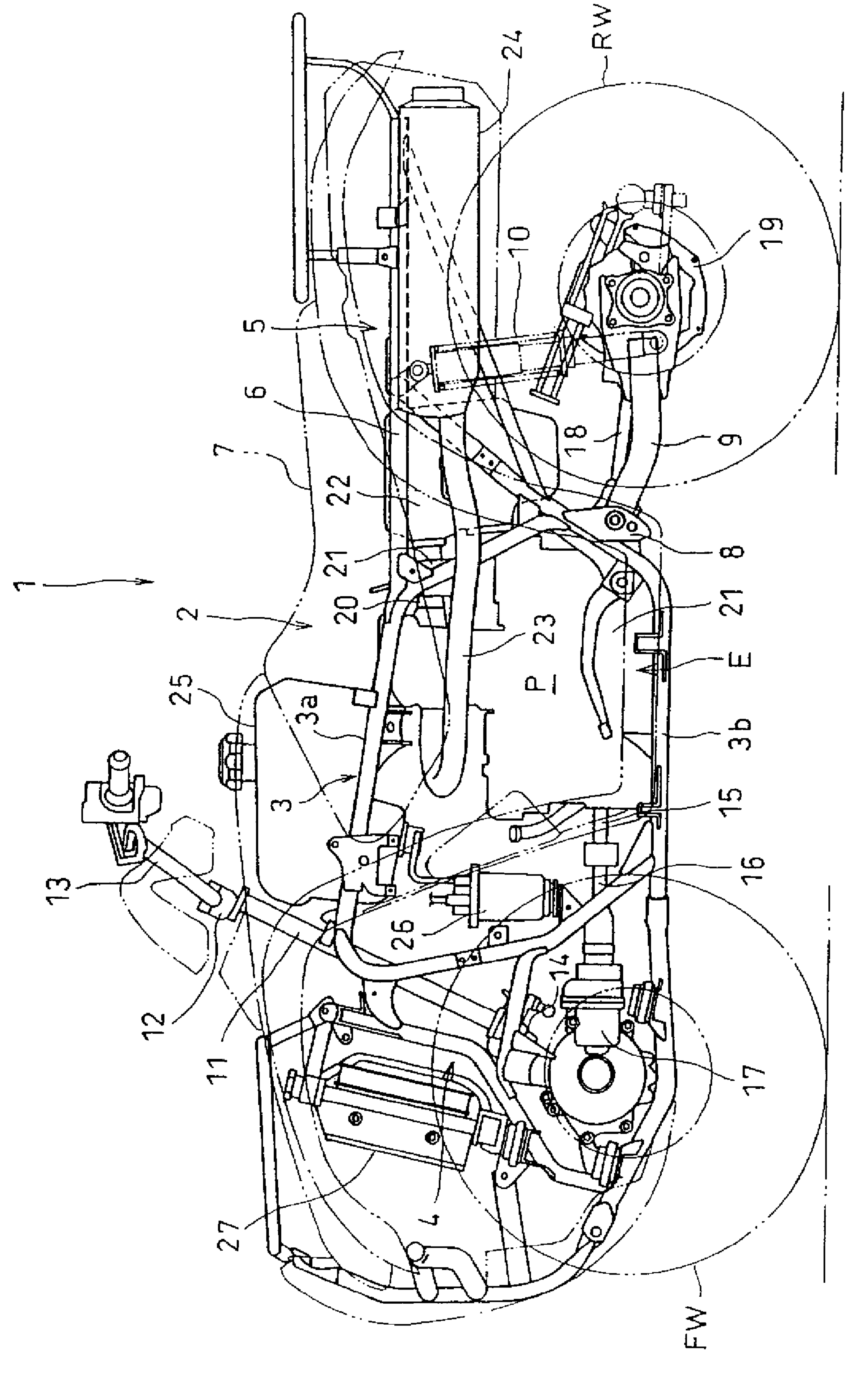
FIG. 1 is a side view illustrating an all terrain vehicle mounted with a power unit thereon according to an embodiment of the invention with its body cover and the like removed.
Figure 2:
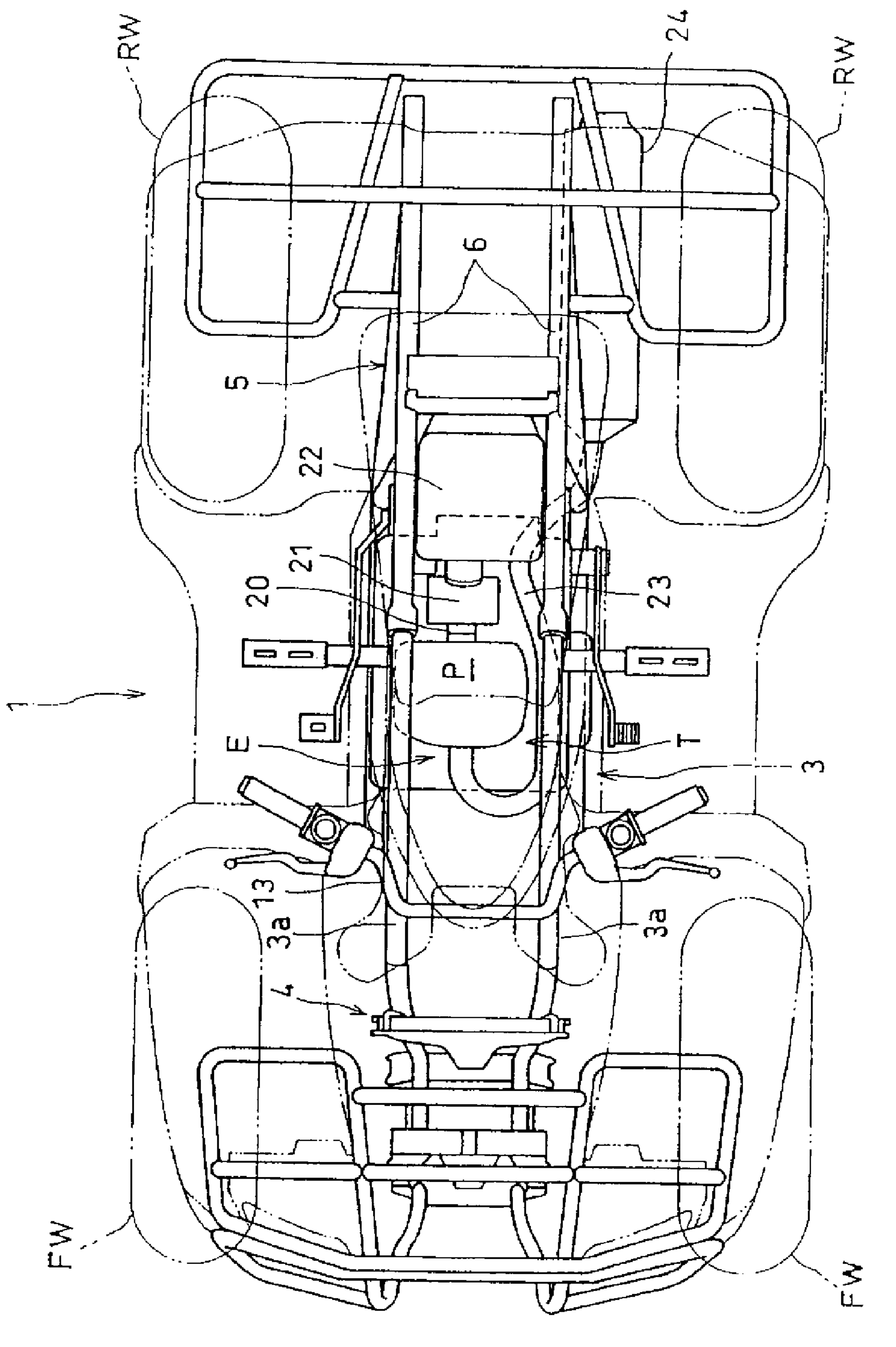
FIG. 2 is a plan view of the all terrain vehicle.

FIGS. 1 and 2 are a side view and a plan view, respectively; illustrating an all terrain vehicle 1 mounted with a water-cooled an internal combustion engine E according to the embodiment with its body cover removed.

The front, the rear or back, the right and the left in the embodiment are determined based on the vehicle that faces the forward travel direction thereof.

The all terrain vehicle 1 is a buggy type four-wheeled vehicle and includes a pair of left and right front wheels FW and a pair of left and right rear wheels RW which are suspended by the front portion and rear portion, respectively, of the body frame 2. The front and rear wheels are shod with all-terrain low pressure balloon tires.

The body frame 2 is composed by joining together a plurality of kinds of steel products and consists of a center frame portion 3, a front frame portion 4 and a rear frame portion 5. The center frame portion 3 is mounted thereon with a power unit P. This power unit P is integrally composed of an internal combustion engine E and a transmission T accommodated in a unit case 31. The front frame portion 4 is joined to the front portion of the center frame portion 3 and suspends the front wheels FW. The rear frame portion 5 is joined to the rear portion of the center frame portion 3 and has seat rails 6 supporting a seat 7.

The center frame portion 3 is configured as below. A pair of left and right upper pipes 3*a* bends downward at their front and rear portions to provide approximately three sides. A pair of left and right lower pipes 3*b* is connected to the left and right upper pipes 3*a*, respectively, to provide the other, approximately one side. Thus, the center frame portion 3 is formed approximately rectangular as viewed from the side.

The left-hand pipes are connected to the corresponding right-hand pipes by cross members.

A pivot plate 8 is fixedly attached to pan of a rear portion included in the lower pipe 3*b*, which part bends obliquely upward. A swing arm 9 is swingably supported at its front end by the pivot plate 8. A rear cushion 10 is interposed between the rear portion of the swing arm 9 and the rear frame portion 5. A rear final reduction gear unit 19 is provided at the rear end of the swing arm 9 and suspends the rear wheel RW.

A steering column 111 is supported by the widthwise central portion of a cross member spanned between the front ends of the left and right upper pipe 3*a*. A steering shaft 12 is steerably supported by the steering column 11. A steering handlebar 13 is coupled to the upper end of the steering shaft 12. The lower end of the steering shaft 12 is coupled to a front wheel steering mechanism 14.

The internal combustion engine E of the power unit P is a water-cooled single cylinder internal combustion engine. This engine E is placed on the center frame portion 3 in the so-called longitudinal mount in such a manner as to direct a crankshaft 30 in the back-and-forth direction of the vehicle body.

The transmission T of the power unit P is disposed in the transmission chamber M on the left side (on the right side in FIG. 3) of the crank chamber C which journals the crankshaft 30 of the internal combustion engine E. An output shaft 15 projects forward and backward from the transmission T close to the left side of the crank chamber C. The rotational power of the output shaft 15 is transmitted from its front end to the left and right front wheels FW through a front drive shaft 16 and a front final reduction gear unit 17. In addition, the rotational power of the output shaft 15 is transmitted from its rear end to the left and right rear wheels RW through a rear drive shaft 18 and the rear final reduction gear unit 19.

The internal combustion engine E is longitudinally provided so as to incline slightly leftward in such a manner that a cylinder block 32, a cylinder head 33 and a cylinder head cover 34 are placed on the unit case 31 in this order. An intake pipe 20 extends rearward from the cylinder head 33 and is connected to an air cleaner 22 via a throttle body 21. An exhaust pipe 23 extends forwardly from the cylinder head 33, bending leftward and toward the rearward, further extending rearward on the left side of an air cleaner 22, and is connected to an exhaust muffler 24.

A fuel tank 25 is supported above the power unit P by the center frame portion 3 of the body frame 2. A fuel pump 26 is disposed forward of and below the fuel tank 25. A radiator 27 is supported by the front frame portion 4 of the body frame 2.

The unit case 31 forming the crank chamber C and transmission chamber M of the power unit P is configured to be anteroposteriorly split into a front unit case 31F and a rear unit case 31R at a plane perpendicular to the crankshaft 30. The crankshaft 30 extends through the central axis of the cylinder bore included in the cylinder block 32.

Figure 3:
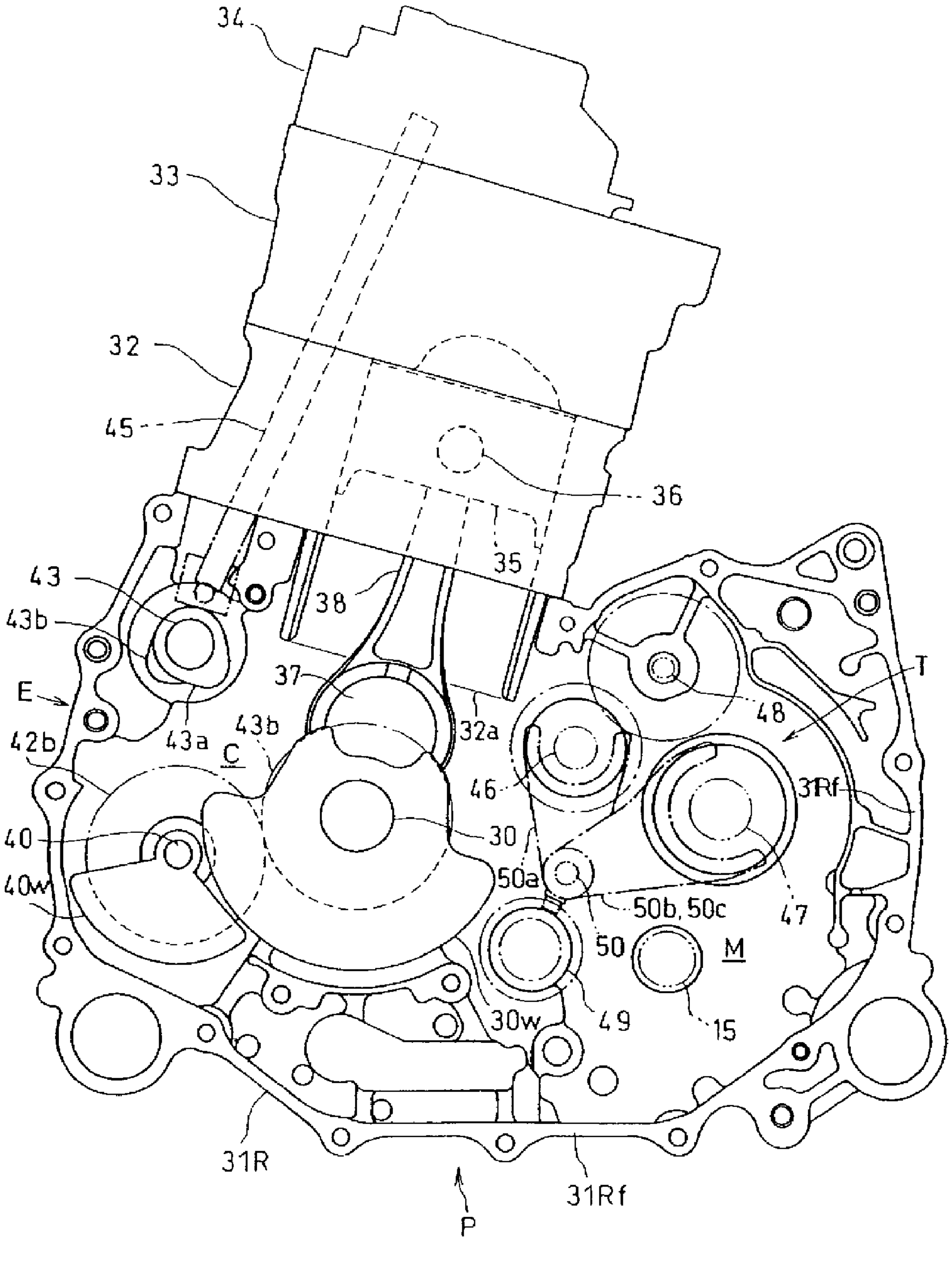
FIG. 3 is a front view of the power unit with the internal combustion engine partially removed.

FIG. 3 is a front view of the power unit P, illustrating a mating surface 31Rf of the rear unit case 31R with the internal combustion engine E partially omitted.

A cylinder sleeve 32*a* extends from the cylinder block 32 into the unit case 31. A piston 35 is slidably fitted into the cylinder sleeve 32*a*.

A crankpin 37 is spanned between a pair of front and rear crank webs 30*w* and 30*w* of the crankshaft 30. A connecting rod 38 connects the crankpin 37 with the piston pin 36 attached to the piston 35.

Figure 4:
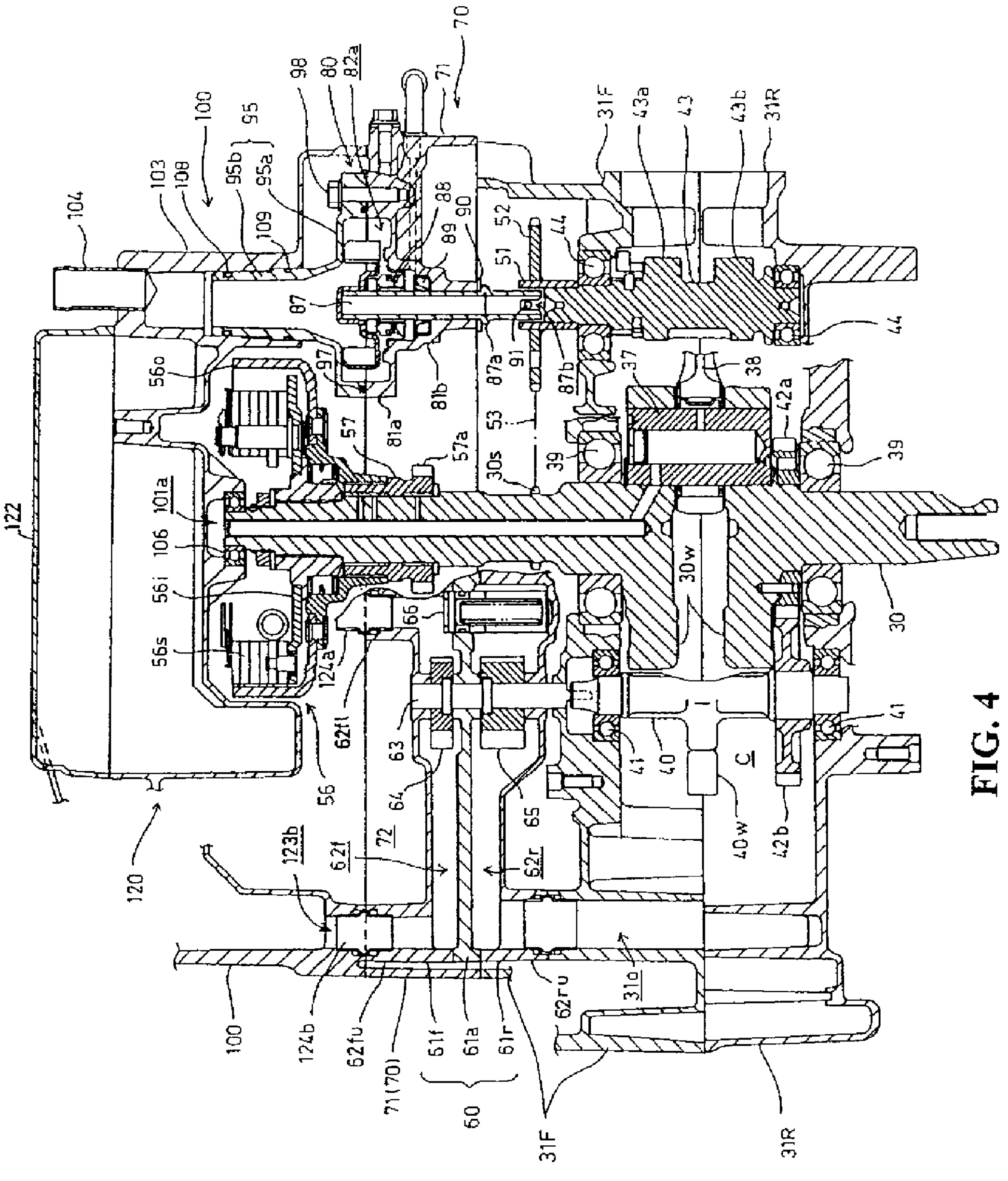
FIG. 4 is a cross-sectional view of a portion of the internal combustion engine.

FIG. 4 is a cross-sectional view illustrating the essential portion of the internal combustion engine E.

As shown in FIG. 4, the crankshaft 30 is journaled by the front unit case 31F and the rear unit case 31R via main bearings 39 and 39 located in front and rear of the crank webs 30*w* and 30*w*, respectively.

A balancer shaft 40 is disposed rightward (leftward in FIG. 3) of, slightly below and parallel to the crankshaft 30. The balancer shaft 40 is journaled at both ends thereof by the front unit case 31F and the rear unit case 31R via bearings 41, 41.

A balancer weight 40*w* is formed at the central portion of the balancer shaft 40. In addition, a driven gear 42*b* is fitted to the rear portion of the balancer shaft 40 and meshes with a drive gear 42*a* fitted to the crankshaft 30 (see FIG. 4).

A valve system cam shaft 43 is located rightward of, obliquely above and parallel to the crankshaft 30. The cam shaft 43 is journaled at both ends thereof by the front unit case 31F and the rear unit case 31R via bearings 44, 44.

A push rod 45 is abutted at its lower end against cam lobes 43*a*, 43*b* of the cam shaft 43. The push rod 45 transmits driving force to a valve mechanism in the cylinder head 33.

The transmission T is disposed leftward (rightward in FIG. 3) of the crankshaft 30. A main shaft 46, a counter shaft 47 and an intermediate shaft 48 constitute a shift gear mechanism. Drive of a shift drum 49 causes the shift gear mechanism to execute shift, which is transmitted to the output shaft 15.

Figure 9:
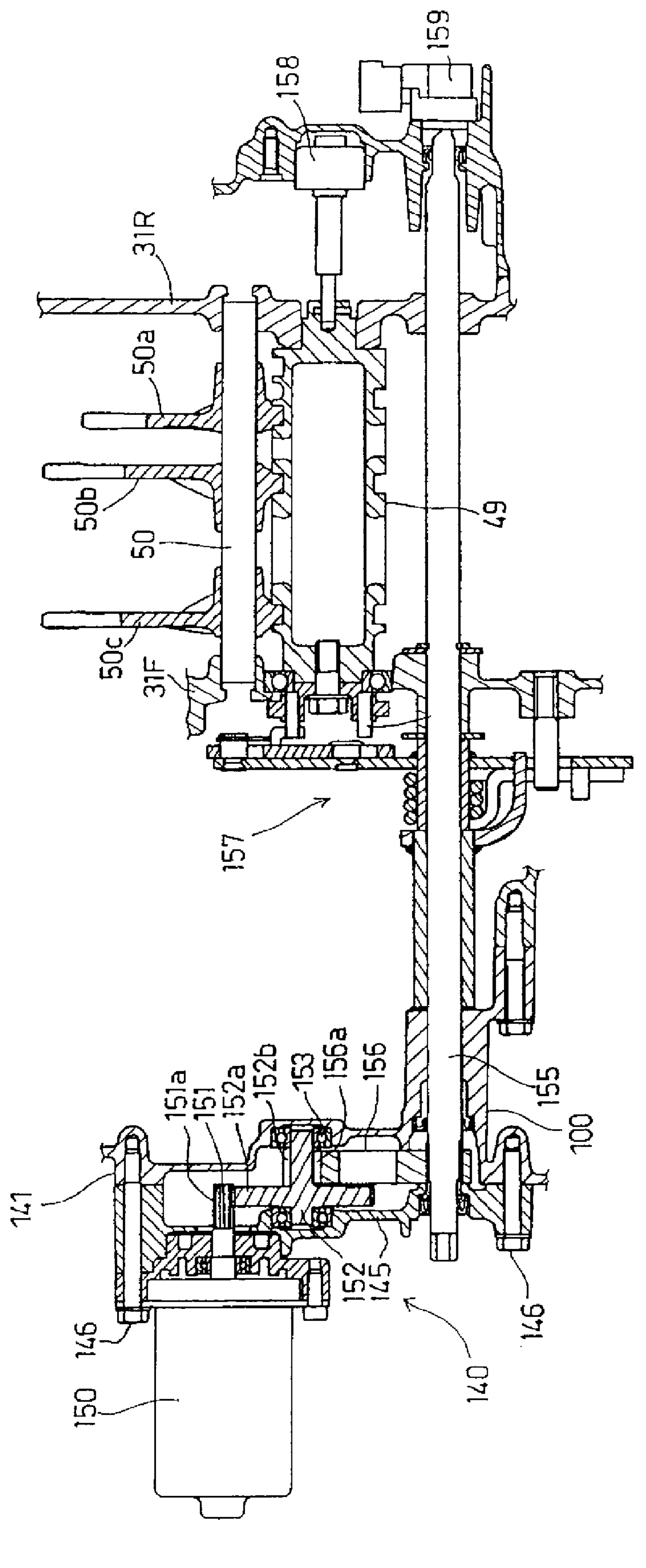
FIG. 9 is a combined cross-sectional view approximately taken along lines IX-IX and IX'-IX' of FIG. 8.

More specifically, as shown in FIG. 9, the shift drum 49 is rotatably supported by the front unit case 31F and the rear unit case 31R and is formed with three shift grooves in the outer circumferential surface thereof. The shift pins of shift forks 50*a*, 50*b*, 50*c* slidably supported by a guide shaft 50 are fitted into the corresponding shift grooves. Rotation of the shift drum 49 allows the shift forks 50*a*, 50*b*, and 50*c* to be guided by the shift groove and moved axially. The movement of the shift fork 50*a* moves gears on the main shaft 46 and the movement of the shift forks 50*b*, 50*c* move gears on the counter shaft 47. Thus, sets of shift gears to be engaged with each other are changed to thereby execute shift.

Figure 5:
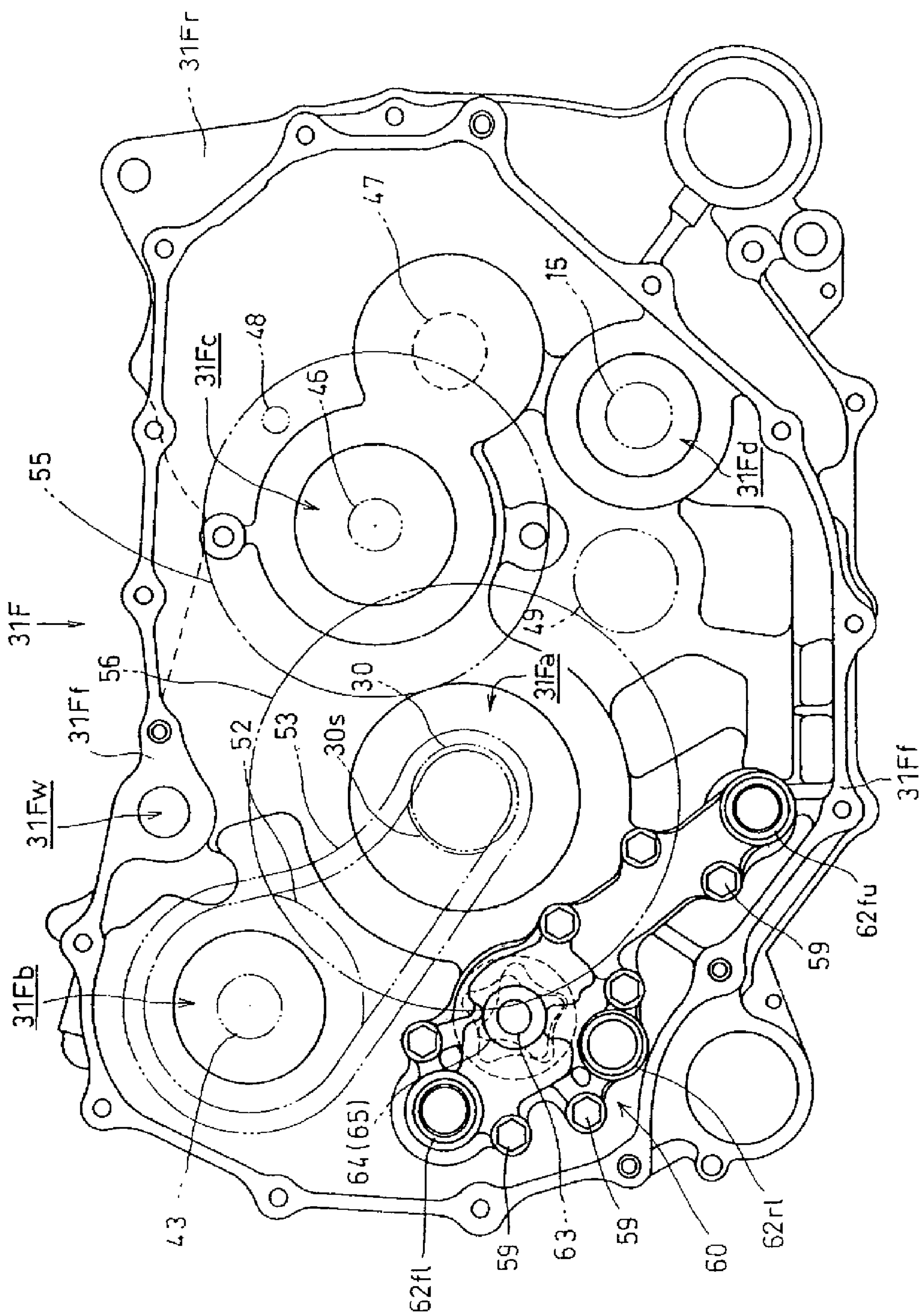
FIG. 5 is a front view of a front unit case.

A rear mating surface 31Fr of the front unit case 31F shown in FIG. 5 is superposed on and fastened to the front mating surface 31Rf of the rear unit case 31R shown in FIG. 3. Thus, the crank webs 30*w* of the crankshaft 30, the balancer weight 40*w* of the balancer shaft 40, the cam lobes 43*a*, 43*b* of the cam shaft 43 and other parts, and the transmission T are housed in the inside between the front unit case 31F and the rear unit case 31R to constitute the unit case 31.

As shown in FIG. 5, the front unit case 31F is formed with circular holes 31Fa, 31Fb, 31Fc, and 31Fd and like. The circular hole 31Fa is adapted to receive the main bearing 39 fitted thereinto and the crankshaft 30 passing therethrough. The circular hole 31Fb is adapted to receive the bearing 44 fitted thereinto and the cam shaft 43 passing therethrough. The circular holes 31Fc and 31Fd are adapted to receive the main shaft 46 and the output shaft 15 passing therethrough, respectively.

Referring to FIG. 4, a connection sleeve 51 provided with a driven sprocket 52 is fitted to the front end of the cam shaft 43 projecting forward from the front unit case 31F. A chain 53 is spanned between the driven sprocket 52 and a drive sprocket 30*s* formed on the crankshaft 30. Rotation of the crankshaft 30 is transmitted to the camshaft 43 via the chain 53 (see two-dot chain line in FIGS. 4 and 5).

An oil pump unit 60 for a dry sump type lubricating system is attached in an annular side wall forming the front mating surface 31Ff by bolts 59. The annular side wall is disposed below the chain 53 and forward of a portion of the front unit case 31F adapted to house the balancer shaft 40 therein. FIG. 5 illustrates a state of the oil pump unit 60 thus attached.

As shown in the cross-sectional view of FIG. 4, the oil pump unit 60 is configured such that a partition wall 61*a* is sandwiched between the front oil pump case 61F and the rear oil pump case 61R and oil passages 62*f* and 62*r* are respectively formed in front and rear of the partition wall 61*a*. A pump drive shaft 63 passes through the front oil pump case 61F, the partition wall 61*a* and the rear oil pump case 61R in the back-and-forth direction and is journaled coaxially with the balancer shaft 40. The rear end of the pump drive shaft 63 further passes through the front unit case 31F and is connected to the balancer shaft 40 for integral rotation.

A feed pump 64 and a scavenging pump 65 are provided in the oil passages 62*f* and 62*r* in front and rear of the pump drive shaft 63, respectively.

A relief valve 66 which enables the front and rear oil passages 62*f* and 62*r* to communicate with each other is insertably supported by the partition wall 61*a*.

An upstream inflow nozzle 62*ru* protrudes rearward of the rear oil passage 62*r* and is connected to an oil passage 31*o* communicating with a strainer (not shown) provided in the unit case 31. A downstream outflow nozzle 62*rl* (see FIG. 5) protrudes forward of the oil passage 62*r* and communicates with an inflow passage 123*a* (see FIG. 6) of the oil tank 120 which is formed in a unit case cover 100 described later.

An upstream inflow nozzle 62*fu* protrudes forward of the front oil passage 62*f* and communicates with an outflow passage 123*b* (see FIG. 6) of the oil tank 120 which is formed in the unit case cover 100. Similarly, a downstream outflow nozzle 62*fl* protrudes forward of the front oil passage 62*f* and communicates with an inflow passage 113*a* (see FIG. 6) of the oil filter 110 which is formed in the unit case cover 100.

When the scavenging pump 65 and the feed pump 64 are rotated together with the pump drive shaft 63 rotated integrally and coaxially with the balancer shaft 40, the scavenging pump 65 sucks the oil accumulated on the bottom surface of the unit case 31 through a strainer and discharge it into the oil tank 120. In addition, the feed pump 64 feeds the oil sucked from the oil tank 120 via the oil filter 10 to portions to be lubricated.

In this way, the oil pump unit 60 and like are attached to the front unit case 31F from the front and covered by the unit case cover 100 from the front. A spacer 70 is interposed between the front unit case 31F and the unit case cover 100.

The spacer 70 is adapted to connect the front unit case 31F with the unit case cover 100. In addition, the spacer 70 is an annular member that has front and rear mating members 70*f* and 70*r* parallel to each other, that is approximately constant in forward and rearward width, and that has a large cavity defined by and inside a circumferential wall 71. The cavity 72 spreads around the periphery of the crankshaft 30, the main shaft 46, the output shaft 15 and the like and around the vicinity of the oil pump unit 60 to be housed therein.

A water pump body 81 of a water pump 80 is formed at a portion corresponding to the cam shaft 43 located at an upper right corner of the circumferential wall 71 of the spacer 70 so as to protrude inwardly from the circumferential wall 71.

The water pump body 81 includes an enlarged-diameter flat cylindrical portion 81*a* which opens forward and coaxially with the cam shaft 43 and a reduced-diameter cylindrical portion 81*b* which is disposed rearward of the flat cylindrical portion 81*a* so as to extend rearward (see FIG. 4).

A half-split annular water passage 82*a* is formed inside the enlarged-diameter flat cylindrical portion 81*a*. A portion of the annular water passage 82*a* tangentially extends to form a half-split discharge water passage. The half-split annular water passage 82*a* and the half-split discharge passage open forward to form an opening end face as a mating surface thereat. A water pump cover 95 is provided with a mating surface having the same shape as the opening end face as the mating surface. This water pump cover 95 is covered on that opening from the front.

A discharge water passage extends rearward from the leading end of the half-split discharge passage and communicates with a discharge water passage 31Fw (see FIG. 5) formed in the front unit case 31F. Thus, cooling water is supplied from the front unit case 31F to portions to be cooled in the cylinder block 32 and the cylinder head 33.

As shown in FIG. 4, a cylindrical water pump drive shaft 87 is inserted into the cylindrical portion 81*b* of the water pump body 81 included in the water pump 80. In this case, the water pump drive shaft 87 is rotatably journaled by the cylindrical portion 81*b* and a water seal member 88 and an oil seal member 89 are fitted to each other, thus providing a double-seal structure.

The pump drive shaft 87 is formed with a slightly enlarged-diameter portion as a protruding portion 87*a*. When the pump drive shaft 87 is inserted into a cylindrical portion 81*b* from the rearward of the water pump body 81, the protruding portion 87*a* comes into abutment against the rear end face of the cylindrical portion 81*b* with a washer therebetween. Thus, the pump drive shaft 87 is restricted to move axially forward.

The rear end of the pump drive shaft 87 is inserted inside the connection sleeve 51 fixedly attached to the front end of the cam shaft 43 coaxial with the pump drive shaft 87. In addition, a pin 91 radially attached to the connection sleeve 51 is fitted into a notch 87*b* formed at the rear end of the pump drive shaft 87. Thus, rotation of the connection sleeve 51 is transmitted to the pump drive shaft 87 via the pin 91.

An impeller 92 is fitted to the front end of the pump drive shaft 87 which projects toward the center of the enlarged-diameter flat cylindrical portion 81*a* of the water pump body 81. In addition, the half-split annular water passage 82*a* of the flat cylindrical portion 81*a* is formed around the impeller 92.

The water pump cover 95 is superposed on a front opening that is formed by the half-split annular water passage 82*a* and half-split discharge water passage of the water pump body 81, thereby covering the impeller 92.

When the pump drive shaft 87 is rotated together with the cam shaft 43 to rotate the impeller 92, cooling water is sucked from the cover cylindrical portion 95*b* of the water pump cover 95, discharged into the annular water passage 82*a* by a centrifugal force and further discharged from the discharge water passage.

The water pump 80 is configured such that the water pump body 81 is formed in the spacer 70 and the water pump cover 95 separate from the water pump body 81 protrudes forward from the spacer 70.

A shift clutch 55 is provided at a portion, within the cavity 72 of the spacer 70, of the main shaft 46 projecting forward from the front unit case 31F. While extending slightly forward of the mating surface of the spacer 70, the shift clutch 55 is generally fitted into the cavity 72 of the spacer 70 (see FIG. 5).

Further, the crankshaft 30 projecting forward from the front unit case 31F passes through the cavity 72 of the spacer 70 and terminates at a position near the front end of the cover cylindrical portion 95*b* of the water pump cover 95 included in the water pump 80. A centrifugal start clutch 56 is provided at the projecting portion of the crankshaft 30 which is located at a position corresponding to the approximate position of the cover cylindrical portion 95*b* (see FIGS. 4 and 5).

Thus, the centrifugal start clutch 56 is disposed forward of the shift clutch 55.

Referring to FIG. 4, the centrifugal start clutch 56 includes a clutch inner 56*i* serving as an input member rotating integrally with a crankshaft 30; a bowl-like clutch outer 56*o* serving as an output member surrounding the clutch inner 56*i* from the radial exterior; and a clutch shoe 56*s* serving as a centrifugal weight which is pivotally supported by the clutch inner 56*i*, swingably moved radially outwardly by a centrifugal force, and comes into contact with and then engagement with the clutch outer 56*o*. A boss portion of the clutch outer 56*o* is spline fitted to a cylindrical gear member 57 rotatably carried by the crankshaft 30.

A drive gear 57*a* of the cylindrical gear member 57 meshes with a driven gear (not shown) associated with the shift clutch 55.

As described above, the unit case cover 100 covers, from the front, the centrifugal start clutch 56 and the water pump cover 95 of the water pump 80 both protruding forward from the front side mating surface of the spacer 70.

The unit case cover 100 has a mating surface 100*r* corresponding to the front mating surface of the spacer 70. A front wall 101 inside the annular mating surface 100*r* is formed to protrude forward (see FIG. 7). The centrifugal starting clutch 56 and the shift clutch 55 are accommodated in this protruding space 102.

Figure 7:
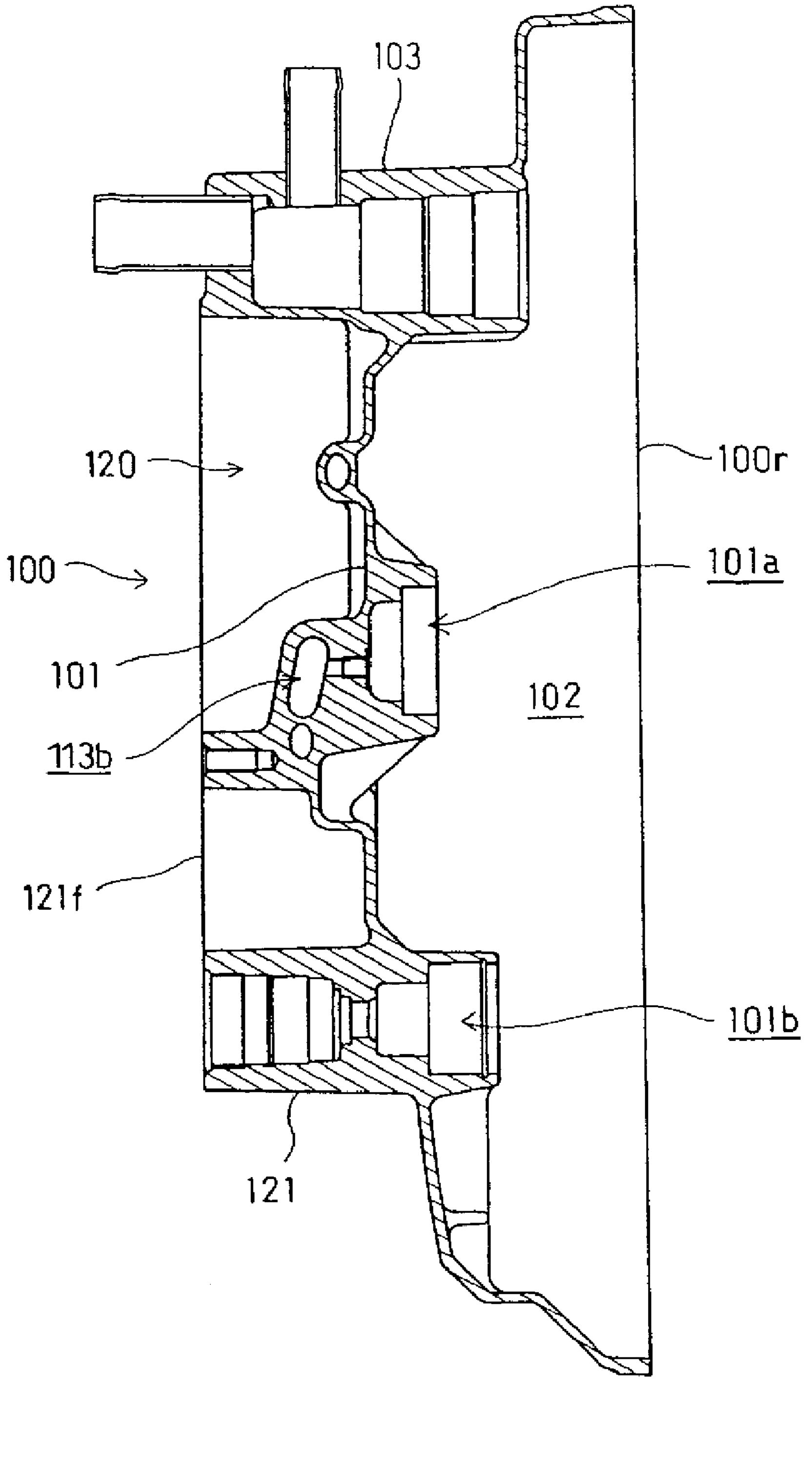
FIG. 7 is a cross-sectional view of the unit case cover taken along line VII-VII of FIG. 6.

As shown in FIG. 7, the front wall 101 is formed with a bearing hole 101*a* adapted to rotatably support the front end of the crankshaft 30 via a bearing 106 and a bearing hole 101*b* adapted to rotatably support the front end of the main shaft 46 via a bearing (not shown).

A connection cylindrical portion 103 is formed at a portion of the unit case cover 100 corresponding to the water pump 80 so as to be directed axially and be able to receive the cover cylindrical portion 95*b* of the water pump cover 95 insertably fitted thereto.

Figure 6:
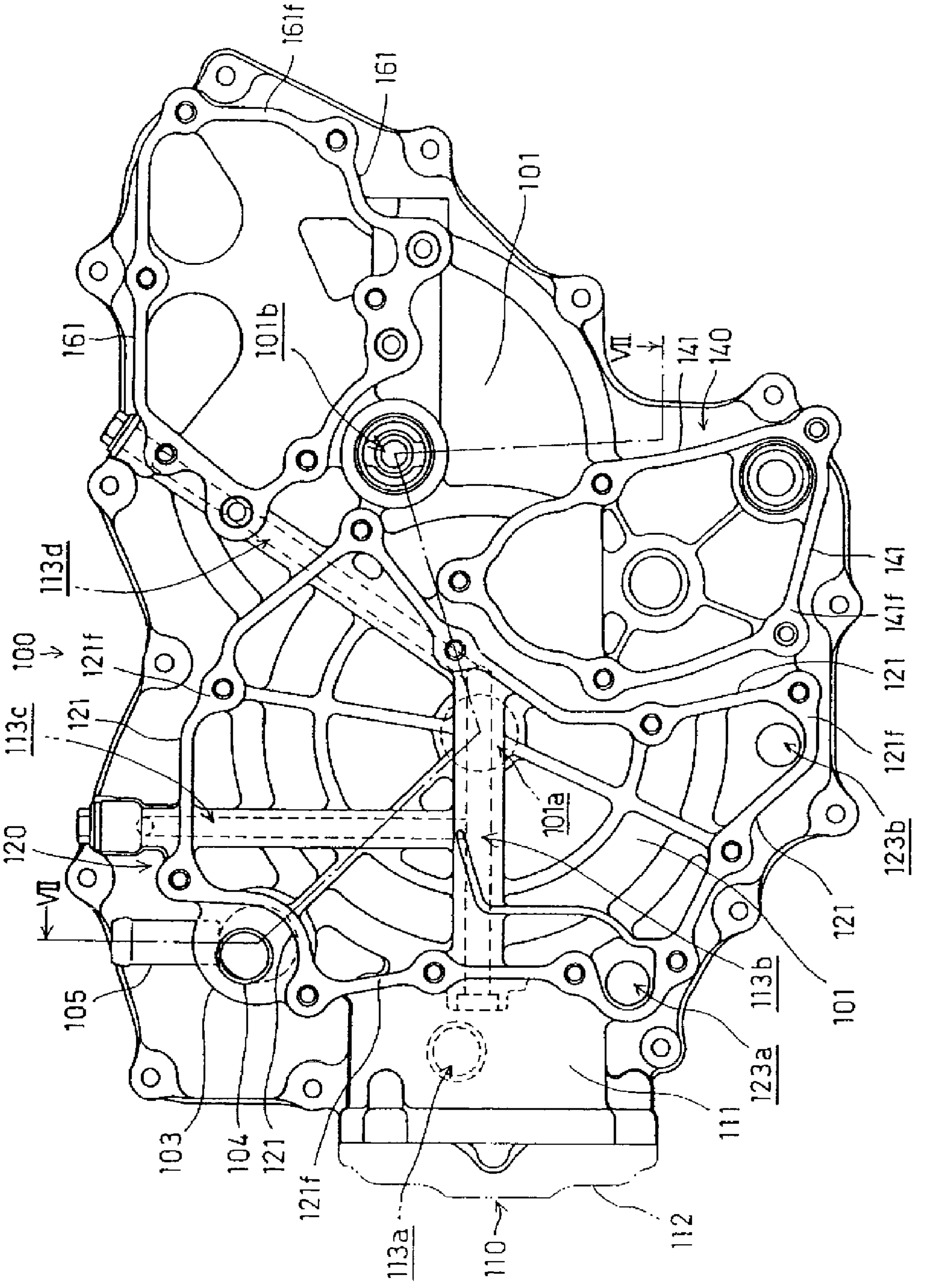
FIG. 6 is a front view of a unit case cover.

As shown in FIG. 6, a right side wall of the unit case cover 100 is formed with a filter case 111 for an oil filter 110. A filter element is inserted in the filter case 111 and a filter cover 112 covers the element from the right, thus constituting an oil filter 105.

The filter case 111 is formed with an inflow passage 113*a* (see FIG. 6) to which a downstream outflow port 62*fl* of the oil pump unit 60 and the connection pipe 124*a* (see FIG. 4) are connected.

An oil passage 113*b* is formed on the front wall 101 of the unit case cover 100 so as to extend from the center of the filter case 111 toward the bearing hole 101*a* rotatably supporting the front end of the crankshaft 30 via a bearing 10. Further, oil passages 113*c*, 113*d* adapted to supply oil to portions to be lubricated are formed to extend from the oil passage 113*b* (see FIG. 6).

The power unit P is of an oil tank-integral type. The unit case cover 100 forms part of the oil tank 120. In addition, a portion of the front wall 101 forms part of the oil tank 120 which is surrounded by a circumferential wall 121 and is located forward of the centrifugal start clutch 56 and close to the crank chamber C.

The opening end face of the circumferential wall 121 is vertical to the axial direction and serves as a mating surface 121*f* with an oil tank cover 122. An inflow passage 123*a* and an outflow passage 123*b* are formed in the circumferential wall 121 and at a lower portion of the front wall 101. The inflow passage 123*a* communicates with the downstream outflow nozzle 62*rl* of the oil pump unit 60 via a connection pipe (not shown). The outflow passage 123*b* communicates with the upstream inflow nozzle 62*fu* of the oil pump unit 60 via a connection pipe 124*b* (see FIG. 4).

The oil tank cover 122 is a flat bowl-like one and includes a circumferential wall 122*a* joined to the circumferential wall 121 of the oil tank 120 formed on the unit case cover 100 and a front wall 122*b* covering the inside of the circumferential wall 122*a*. The mating surface of the oil tank cover 122 is brought into abutment against and fastened, with bolts 126, to the mating surface 121*f* of the circumferential wall 121 of the unit case cover 100. Thus, the circumferential wall 121 is connected to the circumferential wall 122*a* to constitute the oil tank 120 (see FIG. 8).

Figure 8:
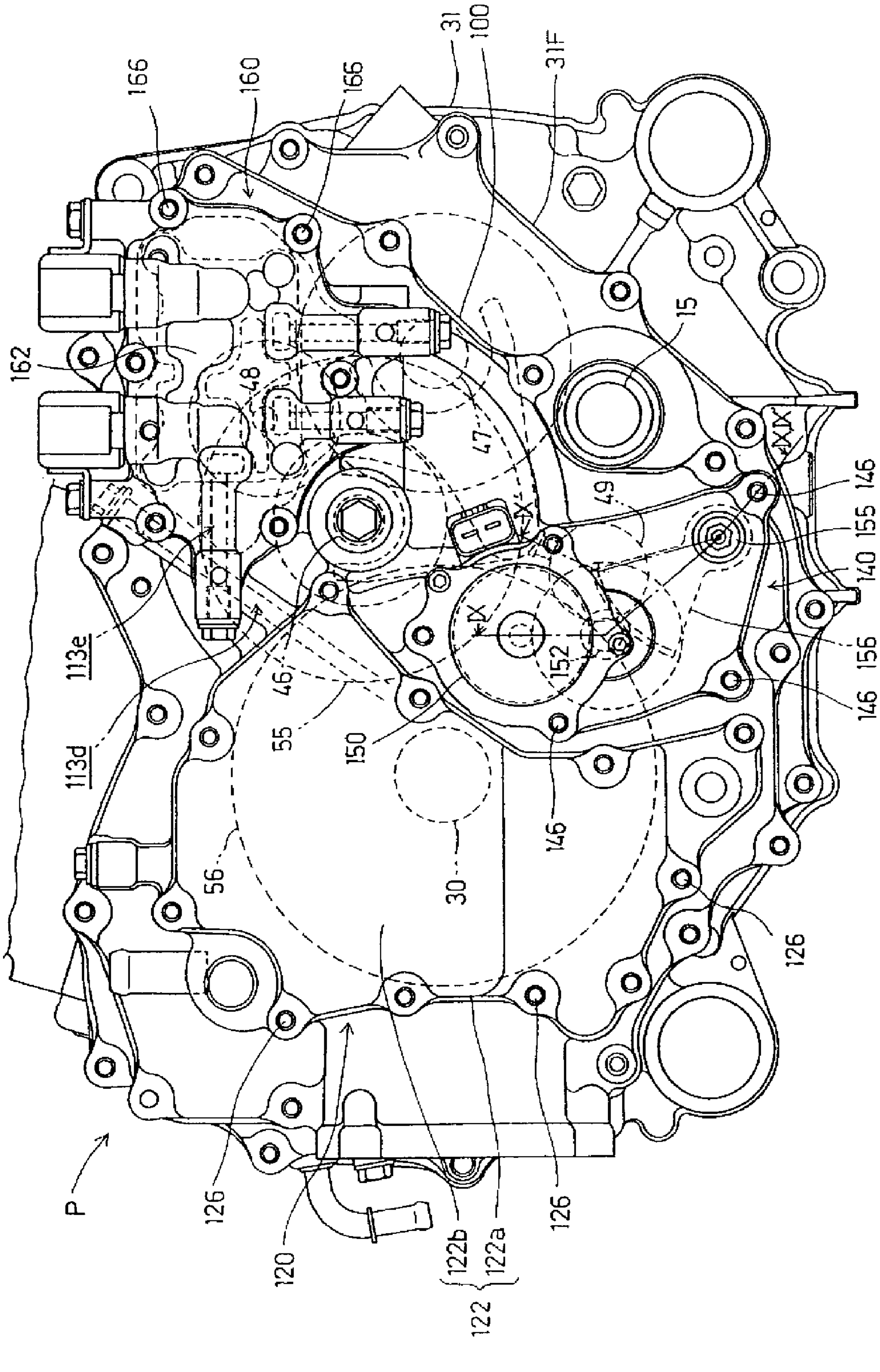
FIG. 8 is a front view of a portion of the power unit.

Referring to FIGS. 6 and 8, the oil tank 120 is provided to approximately occupy the right-half portion of the unit case cover 100, namely, a portion located axially outside the centrifugal start clutch 56 and close to the crank chamber C, to extend over from the lower end to upper end thereof, excluding the lower left-hand part (lower right-hand part in FIGS. 6 and 8) of the above-mentioned portion.

In other words, the oil tank 120 generally, widely occupies the lower right-hand, upper right-hand, upper left-hand parts, excluding the lower left-hand part, of a portion of the unit case cover 100 corresponding to the crank chamber C centering the crankshaft 30.

As described above, the oil tank 120 is disposed at a portion which is located axially outside the centrifugal start clutch 56 and close to the clutch chamber C so as to provide a front wide area. Therefore, the capacity of the oil tank 120 can be sufficiently ensured while reducing the axially outward expansion of the oil tank cover 122. In addition, in the power unit P integrally provided with the oil tank, the entire power unit P can be reduced in size, which improves mount performance on the body frame 2.

A circumferential wall 141 is formed vertically long at the lower left-hand part of a portion of the unit case cover 100 corresponding to the crank chamber C centering the crankshaft 30. A shift drive mechanism 140 which houses a reduction gear therein is arranged in the circumferential wall 141 (see FIG. 6).

A mating surface with an outer circumferential edge formed also vertically long is brought into abutment against a mating surface 141*f* of the circumferential wall 141. Thus, a gear cover 145 is covered on the circumferential wall 141.

The gear cover 145 is fixedly fastened to the circumferential wall 141 of the unit case cover 100 with a plurality of bolts 146.

A shift motor 150 is attached from the front to the front surface of the upper portion of the gear cover 145.

Some of the bolts 146 fasten the shift motor 150 and the gear cover 145 together.

A shift spindle 155 disposed in the leftward lower end of the gear cover 145 exposes its front end and extends rearward to pass through and be journaled by the unit case cover 100, the front unit case 31F and the rear unit case 31R (see FIGS. 8 and 9).

A shift transmission means 157 is interposed between the shift drum 49 and a portion of the shift spindle 155 along the front surface of the front unit case 31F. Rotation of the shift spindle 155 turns the shift drum 49 via the shift transmission means 157 at a desired angle (see FIG. 9).

Incidentally, the rotational angle of the shift drum 49 is detected by a rotational angle detector 158 which is provided rearward of and coaxially with the shift drum 49 to detect a shift position.

The rotational angle of the shift spindle 155 itself is detected by a rotational angle detector 159 provided rearward of and coaxially with the shift spindle 155.

A motor drive shaft 151 of the shift motor 150 which projects rearward from the gear cover 145 is formed with a small diameter drive gear 151*a* at its rear end.

A sectoral gear shift arm 156 is fitted to the shift spindle 155 at a position between the unit case cover 100 and the gear cover 145.

The gear shift arm 156 has a sectoral center portion fitted to the shift spindle 155 and an outer circumferential are portion formed with a large diameter gear 156*a*.

An idle gear shaft 152 is supported at both ends thereof for rotation by the unit case cover 100 and the gear cover 145 via bearings 153, 153 at a position between the motor drive shaft 151 of the shift motor 150 and the shift spindle 155 (see FIG. 9).

The idle gear shaft 152 is formed with a large diameter gear 152*a* and a small diameter gear 152*b* which are integrally formed to be rowed back and forth.

The front large diameter gear 152*a* of the idle gear shaft 152 meshes with the drive gear 151*a* of the motor drive shaft 151. On the other hand, the rear small diameter gear 152*b* meshes with the large diameter gear 156*a* of the gear shift arm 156 attached to the shift spindle 155.

Thus, the shift motor 150 is driven to rotate the motor drive shaft 151 and then the rotational speed of the motor drive shaft 151 is reduced via the idle gear shaft 152. In this way, the rotational power is transmitted to the shift spindle 155.

The rotation of the shift spindle 155 turns the shift drum 49 at a desired angle via the sift transmission means 157 as described above. The turn of the shift drum 49 at a desired angle moves the shift forks 50*a*, 50*b*, 50*c* to change the meshing engagement of the shift gears, performing shift operation.

As described above, on the front side portion of the unit case cover 100 corresponding to the crank chamber C, the shift drive mechanism 140 is disposed at the lower left-hand part. In addition, the oil tank 120 is disposed to surround the shift drive mechanism 140 from the right, that is, to largely extend from the lower left through the upper left to the upper right.

A hydraulic control valve unit 160 which controls the shift clutch 55 is disposed at the upper front portion of the unit case cover 100 corresponding to the mission chamber M located on the left side of the crank chamber C.

Referring to FIGS. 6 and 8, a circumferential wall 161 where the hydraulic control valve unit 160 is constituted is formed above the portion of the unit case cover 100 corresponding to the transmission chamber M. An outer circumferential edge-formed mating surface of a valve housing 162 is brought into abutment against a mating surface 161*f* of the circumferential wall 161. Thus, the valve housing 162 is fixedly attached to the mating surface 161*f* of the circumferential wall 161 with bolts 166 (see FIG. 8).

The hydraulic control valve unit 160 includes a valve housing 162 and a plurality of hydraulic control valve housed in the valve housing 162. Oil is supplied to the hydraulic control valve unit 160 via a branch oil passage 113*e* branched from the oil passage 113*d* (see FIG. 8).

As shown in FIG. 6, the bearing hole 101*b* adapted to journal the front end of the main shaft 46 is located close to the circumferential wall 161. Control oil from the hydraulic control valve unit 160 is fed to a hydraulic chamber of the shift clutch 55 via the bearing hole 101*b*, controlling the disengagement and engagement of the shift clutch 55.

Referring to FIG. 8, the output shaft 15 is located below the hydraulic control valve unit 160 so as to pass through the front unit case 31F and project from the transmission chamber M.

The shift motor 150 together with the shift drive mechanism 140 is located on the right of the output shaft 15.

In short, the shift motor 150 is disposed at a position surrounded by the oil tank 120, the hydraulic control valve unit 160 and the output shaft 15.

As described above, in the power unit P, the oil tank 120 is disposed by use of the relatively wide area-space located close to the crank chamber C and on the outside of the unit case cover 100. Therefore, the oil tank 120 does not interfere with the hydraulic control valve unit 160 of the shift clutch 55 exteriorly disposed close to the transmission chamber M. In addition, the oil tank 120 can easily ensure a sufficient capacity while reducing its amount of protrusion from the unit case cover 100. Further, the power unit P can be downsized by avoiding the lateral expansion of the unit case 31.

The hydraulic control valve unit 160 controlling the shift clutch 55 is appropriately disposed close to the transmission chamber M. In addition, the hydraulic control valve unit 160, the oil tank 120 and other equipment are collectively arranged on the unit case cover 100. This shortens the oil passages, thereby reducing the pump loss of the feed pump 64.

Further, the oil tank 120 is provided to extend from the lower end to upper end of the unit case cover 100, ensuring a sufficient capacity. The shift motor 150 is arranged by use of the space surrounded by the oil tank 120, the hydraulic control valve unit 160 and the output shaft 15. Accordingly, the equipment can efficiently be arranged by effectively utilizing the space, which can make the entire power unit P compact.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A power unit provided with a dry sump type lubricating device, said power unit comprising:

a power unit case divided into a front unit case and a rear unit case, a power unit case cover that covers at least one of said front unit case and said rear unit case;

a crank chamber formed by said power unit case;

a crankshaft rotatably supported by said crank chamber;

a transmission chamber disposed adjacent to said crank chamber;

a shift shaft rotatably supported by said transmission chamber;

an oil tank disposed on the crank chamber side of an anteroposterior outside surface of said power unit case cover and extending from a lower end of said power unit case cover to an upper end of said power unit case cover;

a shift motor for shifting a shift gear of the shift shaft is disposed on said power unit case cover; and a hydraulic control device for controlling a shift clutch, provided on said transmission chamber side of the anteroposterior outside surface of said power unit case cover, wherein said oil tank is disposed at a location which is provided axially outside said crankshaft, said shift motor is surrounded by said oil tank, said hydraulic control device and an output shaft projecting from said transmission chamber, and said oil tank, said hydraulic control device, and said shift motor are overlapped with said shift clutch in an axial direction of said crankshaft.

2. The power unit according to claim 1, wherein:

said power unit case is split into said front unit case and said rear unit case at a plane perpendicular to said crankshaft, and said crankshaft extends through a central axis of a cylinder bore included in a cylinder block.

3. The power unit according to claim 1, wherein said oil tank is formed in said power unit case cover.

4. The power unit according to claim 1, further comprising:

a spacer connecting said front unit case to said power unit case cover, wherein said spacer is disposed between said front unit case and said power unit case cover.

5. The power unit according to claim 1, further comprising:

an oil pump unit attached to a front mating surface of said front case unit, wherein said oil pump unit includes a partition wall provided between a front oil pump case and a rear oil pump case and at least one oil passage is formed in said partition wall.

6. The power unit according to claim 5, wherein:

a pump drive shaft passes through said front oil pump case, said partition wall, said rear oil pump case and said front unit case, and said pump drive shaft is connected to a balancer shaft.

7. A power unit provided with a dry sump type lubricating device, said power unit comprising:

a power unit case divided into a front unit case and a rear unit case, a power unit case cover that covers at least one of said front unit case and said rear unit case;

a crank chamber formed by said power unit case;

a crankshaft rotatably supported by said crank chamber;

a transmission chamber disposed adjacent to said crank chamber;

a shift shaft rotatably supported by said transmission chamber;

an oil tank disposed on the crank chamber side of an anteroposterior outside surface of said power unit case cover;

a hydraulic control device for controlling a shift clutch, provided on said transmission chamber side of the anteroposterior outside surface of said power unit case cover;

an oil pump unit attached to a front mating surface of said front case unit, wherein said oil pump unit includes a partition wall provided between a front oil pump case and a rear oil pump case and at least one oil passage is formed in said partition wall, and a pump drive shaft that passes through said front oil pump case, said partition wall, said rear oil pump case and said front unit case, wherein said pump drive shaft is connected to a balancer shaft, and said oil tank is disposed at a location which is provided axially outside said crankshaft.

* * * * *